Oct. 27, 1942.   R. M. NARDONE   2,300,002
ENGINE STARTING MECHANISM
Filed Dec. 26, 1940
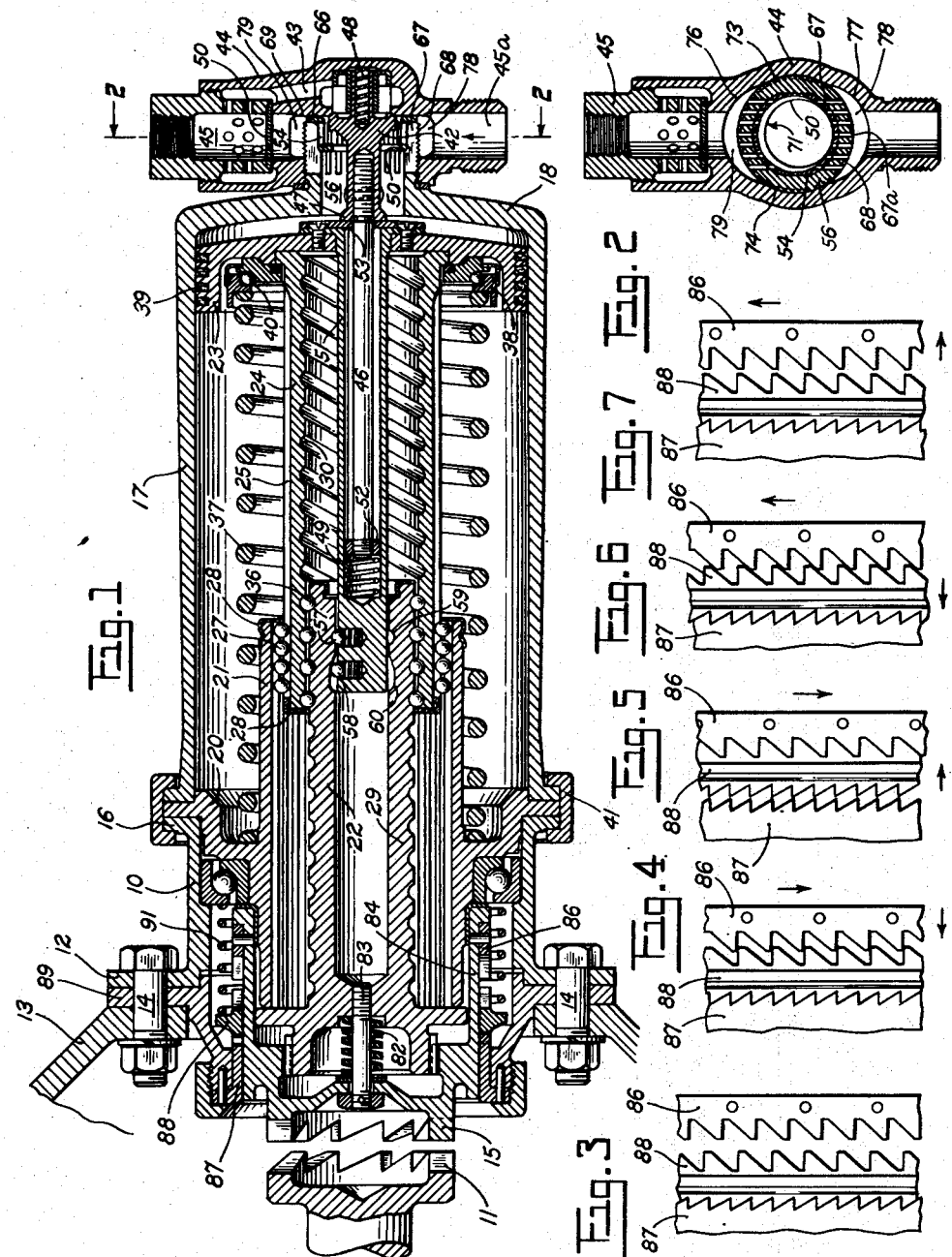
INVENTOR.
Romeo M. Nardone
BY Martin J. Finnegan
ATTORNEY.

Patented Oct. 27, 1942

2,300,002

UNITED STATES PATENT OFFICE 2,300,002

ENGINE STARTING MECHANISM

Romeo M. Nardone, Westwood, N. J., assignor to Bendix Aviation Corporation, South Bend, Ind., a corporation of Delaware Application December 26, 1940, Serial No. 371,846

4 Claims. (Cl. 123—179)

This invention relates to starting mechanism for internal combustion engines, and particularly to mechanism wherein there is incorporated an element that is adapted to impart initial rotary movement to the engine by actual engagement with a rotatable part thereof.

One of the objects of this invention is to provide a novel method of and means for protecting the starter parts from the adverse effects that might otherwise be produced by a "back-fire," or premature ignition of the engine to be started.

Another object of the invention is to provide additional improvements in the type of engine starter disclosed in my Patent No. 2,144,196 granted by the United States Patent Office on January 17, 1939, the nature and scope of which improvements are indicated in the accompanying drawing and the following particular description of one form of mechanism embodying the invention. It is to be understood, however, that the drawing is for the purpose of illustration only, and is not designed as a definition of the limits of the invention, reference being had to the appended claims for this purpose.

In the drawing,

Fig. 1 is a longitudinal sectional view of a device embodying the invention;

Fig. 2 is a transverse view along line 2—2 of Fig. 1; and

Figs. 3-7 are diagrammatic views showing the several stages of ratchet action during a "back-fire."

With reference to the drawing, and more particularly to Fig. 1, the engine starting mechanism is contained within a sectional housing including cylindrical parts 17 and 10, the latter having a flange 12 by which it is secured to an engine crankcase 13 as by bolts 14, the flange being conveniently of a size stardardized for aircraft engine starters. The engine crankshaft, or other drive shaft (not shown) is provided with a clutch-element 11 engageable by the piston actuated clutch-element 15 as will be later more fully described.

Cylinder 17 has a head end 18 and a crank end 20, the latter being shown as an integral part of a splined tube 21. Slidably fitted within the cylinder 17 is a piston 23 movable with a hollow internally and helically grooved screw 24 which is externally splined as at 25, to cooperate with the internally splined tube 21. Between the cooperating grooves 25 and 26 are placed a series of friction reducing members shown as balls 27 assembled in a cylindrical cage, the end rows of balls having their surfaces engageable with plates 28 located at each end of the splined grooves to facilitate free rolling movement of the balls which they engage at points spaced above or below the mid-plane thereof, and also to hold the cage against more than a predetermined endwise movement. A second screw 22 is drivably connected with the screw 24 by helical grooves or threads 29 and 30 which permit the axial travel of the piston 23 but cause rotation of the screw 22 because of friction reducing balls 36 inserted in the helical grooves 29 and 30. A spring 37 has one end resting against the closure plate 20 of the cylinder 17, and its opposite end abuts the thrust ring 38, which is, in effect, the outer race of a ball bearing assembly 40 axially movable with but rotatably free of the piston 23, the intervening bearing balls 40 facilitating free rotation of outer race 38 of the bearing, the outer race being possibly constrained to rotation by the natural twisting tendency of a spring such as the spring 37, as the latter is compressed in the forward travel of the piston. Piston rings 39 insure against the loss of pressure as the piston moves forward, and also yieldably oppose rotation of the piston, even though twisting of spring 37 should occasionally cause outer race 38 to rotate to some extent.

Due to the bolted split clamp connection 41 between the cylinder 17 and the body flange 16, the former may be quickly detached for removing any fouling that may occur where combustible cartridges are used as the source of fluid pressure to move the piston 23.

An exhaust valve 42 is shown as cooperating with an exhaust port 43 conveniently formed in the housing 44, and communicating with an exhaust connection 45 leading to any desired point. In the case of an airplane, for example, this exhaust connection will lead to a point exteriorly of the fuselage. The valve 42 is carried by a stem 46 which is of such a length that with the piston in its position as indicated in Fig. 1, a spring 49 will bear against an enlarged head 52 on the stem 46 to hold valve 42 closed. At the commencement of an operative cycle of the motor, such as is occasioned by the delivery of fluid pressure to the chamber formed by the neck-portion 56 of the housing 18, this fluid pressure will act upon the head portion of the valve 42 in such manner as to assist the spring 49 in maintaining the said exhaust valve 42 closed; but as the piston nearly reaches the end of its movement, a collar 53 extending inwardly of piston 23 and surrounding the stem 46 will be brought into engagement with the head 52 and, will be effective to unseat the exhaust valve 42. The exhaust valve having been unseated in the manner described, the spring 48 will be effective for holding it in open position, its maximum opening movement being limited by a longitudinally slotted cylindrical stop 54 having a flange 66 abutting the end surfaces of the fingers 67 (shown in transverse section of Fig. 2) formed by longitudinally slotting the neck-portion 56 of the housing 18. This neck-portion 56 is externally threaded, as shown at 68, to receive the housing 44, the latter being screwed up on the threads 68 until surface 69 of the housing 44 abuts the flange 66 of the stop 54 and with the inlet passage 45a aligned with the longitudinal slots between fingers 67. Stop 54 is adapted to be first slipped over the valve head 42; and due to the eccentricity (indicated at 50 in Fig. 2) of the apertured portion of the base 71 of the said stop, the said base has sufficient surface remaining to constitute a stop or abutment for valve head 42 in the open position of the latter, while at the same time being apertured sufficiently to permit insertion and withdrawal over said valve head.

The piston having completed its operative stroke, and the exhaust valve having been opened, the piston will be urged on its return stroke by the coil spring 37. During this return movement, the exhaust valve being held open, the cylinder will be effectively scavenged. Due to the action of the spring 48 the valve will remain open until such time as the piston collar 53 is brought to bear against the valve stem 47 for again seating the valve. This insures closing movement of the valve at the time the piston has substantially completed its return movement, the closing being initiated and assisted by the action of the spring means 49 above described. There is thus provided automatically controlled exhaust means, which exhaust means is of such construction as to remain open during the major portion of the return stroke of the piston so as to insure substantially complete scavenging, as more fully explained in my Patent No. 2,197,155, granted April 16, 1940.

By reason of the action of spring-pressed balls 57 and 58 upon grooves 59 and 60, respectively, in sleeve 22, the initial axial movement of the piston 23 will be transmitted to said sleeve 22, and the axial thrust thus imparted to jaw 15 (through spring 82 surrounding rod 83) will establish engagement with the engine member 11. Upon such engagement the resulting resistance to further axial travel will cause, first, a commencement of rotation on the part of sleeve 22, and secondly, a slipping of the balls 57 and 58 from the grooves 59 and 60, so that they may be free to ride along the inner bore of the sleeve 22 as the piston continues forward.

The means for protecting the starter from the effects of a "back-fire" will now be described. On the skirt 84 of engine engaging member 15 there is secured a ratchet-tooth clutch element 86, constituting one of a series, the others being shown at 87 and 88. Clutch element 87 is pinned to the housing element 89, and clutch element 88 lies between the other two, although urged to the left by a spring 91, wherefore the left-hand teeth thereof are normally locked in mesh with the teeth of stationary clutch element 87.

Figs. 3 to 7 show the relationship of the elements 86, 87 and 88 during successive stages in the cranking action, under those conditions wherein a "back-fire" occurs. The relationship indicated in Fig. 3 is the relationship obtaining before any movement of the piston 28, and therefore it is the same as that of Fig. 1.

From this position the engine-engaging member 15, with its integral skirt 84 carrying the clutch element 86, moves forward to engage the engine member 11 in response to the first movement of the piston 23 as heretofore explained. When this engagement is complete the ratchet teeth of clutch element 86 will have assumed the relationship, with respect to the adjacent clutch element 88, that is indicated diagrammatically in Fig. 4. With the parts in this relationship, cranking of the engine begins, the direction of rotation being such as to cause the teeth of clutch element 86 (and hence the clutch element 88) to move in the direction of the vertical arrows in Figs. 4 and 5. Now as clutch element 87 is held against rotation, as heretofore explained, there will necessarily be a ratcheting or camming action as between the elements 87 and 88, which camming action will shift the clutch element 88 to the right and therefore into closer mesh with the clutch element 86 by which the element 88 is being rotated. This closer relationship is illustrated diagrammatically in Fig. 5, and this is the relationship of the parts during the entire period of the cranking action under normal conditions—that is, in the absence of a "back-fire" of the engine being started. On those occasions, however, when such a "back-fire" occurs, the first effect thereof is to reverse the direction of rotation of the engine engaging member 15 and thereby cause some rotation of the clutch element 86 in the direction of the vertical arrow in Fig. 6. This reversal produces a new camming action as between the engaged teeth of the elements 86 and 88, which camming action, taken in conjunction with the action of the spring 91, results in a leftward movement of the element 88 into a condition of complete mesh with the stationary clutch element 87; in other words, the parts assume the relationship of Fig. 6, in which relationship the element 88 is held against further movement in the direction in which the clutch element 86 is now moving and therefore the former operates to move the clutch element 86 (hence the engine-engaging member 15) further to the right, or in other words, into a relationship indicated diagrammatically in Fig. 7, in which relationship the engine-engaging member 15 has been completely withdrawn from contact with the teeth of the engine member 11; and as such complete withdrawal will of course occur at a time when the engine-engaging member 15 has rotated backward only a relatively few degrees from the position at which the reversal of direction of rotation occurred, it follows that no substantial reverse impack is imparted to the starter mechanism, such as might be the case if the reversal of direction were prolonged until the entire effect of the back-fire of the engine had been absorbed. Instead of such entire absorption of back-fire impact by the starter, the latter is now free and clear of the reversely rotating engine member, so that the major force of the back-fire will have been expended before the engine-engaging member 15 is again advanced into engagement with the engine member 11 by reason of the continued application of pressure to the piston 23—assuming that the fluid is still being admitted to the piston and that the piston has not yet reached the forward limit of its stroke. If, however, the full force of the back-fire has not been expended by the time the engine-engaging member 15 re-engages the engine member 11, there will be a repetition of the automatic withdrawing action above described, to be followed by a new re-engagement; such cycle continuing until the piston 23 has completed the cranking stroke. Upon such completion, the spring 37 will operate to return the piston 23 to its initial position and bring about an exhaust of the operating fluid by reason of the functioning of the exhaust valve 42 in the manner explained more fully in my Patent No. 2,197,155 above identified.

Although the invention has been explained herein by showing the effect thereof when applied to an engine starting mechanism of the fluid actuated type, it will be apparent that the invention may also be embodied in engine starters of different construction and utilizing other sources of energy. Thus, for example, engine starters of the direct cranking and inertia type as shown, respectively, in my Patents No. 1,926,913 and No. 2,156,667—both of which embody engine engaging members similar to the engine-engaging member 15 of Fig. 1 of the present disclosure—could have incorporated therein mechanism embodying the present invention, in which case the engine-engaging member would be modified to carry a ratchet element corresponding to the ratchet element 86 of the present disclosure, and there would be provided in association therewith additional ratchet elements constructed and arranged to operate as do the ratchet elements 87 and 88 above described.

What is claimed is:

1. In an engine starter, in combination, a starting means having an axially movable, rotatable engine engaging member, means for driving said engine-engaging member, said driving means including a second axially movable member, a compression spring interposed between said two members, a clutch element rotatable with said engine engaging member, means engageable with said clutch element to move said engine engaging member axially in a direction away from the engine engaging position in response to a sudden increase of resistance to cranking resulting from a "back-fire" or the like, and fluid pressure actuated means constantly exerting pressure upon said compression spring to urge said engine engaging member back to engine engaging position during the "back-fire" period.

2. In an engine starter, in combination, a starting means having a rotatable engine engaging member, means for driving said engine-engaging member, said driving means including a second axially movable member, a compression spring interposed between said two members, a clutch element rotatable with said engine engaging member, means engageable with said clutch element to move said engine engaging member in a direction away from the engine engaging position in response to a sudden increase of resistance to cranking resulting from a "back-fire" or the like, and fluid pressure actuated means constantly exerting pressure upon said compression spring to urge said engine engaging member back to engine engaging position during the "back-fire" period.

3. In an engine starter, in combination, a starting means having an axially movable, rotatable engine engaging member, means for driving said engine-engaging member, said driving means including a second axially movable member, a compression spring interposed between said two members, a clutch element rotatable with said engine engaging member, means engageable with said clutch element to move said engine engaging member axially in a direction away from the engine engaging position in response to a sudden increase of resistance to cranking resulting from a "back-fire" or the like, and means constantly exerting pressure upon said compression spring to urge said engine engaging member back to engine engaging position during the "back-fire" period.

4. In an engine starter, in combination, a starting means having a rotatable engine engaging member, means for driving said engine-engaging member, said driving means including a second axially movable member, a compression spring interposed between said two members, a clutch element rotatable with said engine engaging member, means engageable with said clutch element to move said engine engaging member in a direction away from the engine engaging position in response to a sudden increase of resistance to cranking resulting from a "back-fire" or the like, and means constantly exerting pressure upon said compression spring to urge said engine engaging member back to engine engaging position during the "back-fire" period.

ROMEO M. NARDONE.